United States Patent
Kleineisel

(10) Patent No.: US 6,973,940 B2
(45) Date of Patent: Dec. 13, 2005

(54) HYDRAULIC CONTROL VALVE

(75) Inventor: Gustav Kleineisel, Mainaschaff (DE)

(73) Assignee: Linde Aktiengesellschaft, (DE)

( * ) Notice: Subject to any disclaimer, the term of this patent is extended or adjusted under 35 U.S.C. 154(b) by 0 days.

(21) Appl. No.: 10/787,787

(22) Filed: Feb. 26, 2004

(65) Prior Publication Data

US 2004/0168731 A1 Sep. 2, 2004

(30) Foreign Application Priority Data

Feb. 28, 2003 (DE) .............................. 103 08 910

(51) Int. Cl.[7] .......................................... F15B 13/044
(52) U.S. Cl. .............................................. 137/596.17
(58) Field of Search ................................. 137/596.17

(56) References Cited

U.S. PATENT DOCUMENTS 4,719,944 A * 1/1988 Cleasby ................. 137/596.17
5,144,881 A 9/1992 Cakmaz
5,209,261 A 5/1993 Cakmaz et al.
5,323,809 A 6/1994 Tischer et al.

FOREIGN PATENT DOCUMENTS

DE 38 11 669 A1 10/1988
DE 102 24 731 A1 1/2003

* cited by examiner

*Primary Examiner*—Gerald A. Michalsky
(74) *Attorney, Agent, or Firm*—The Webb Law Firm

(57) ABSTRACT

A hydraulic control valve (1) is assigned to a pressure line (13) led from a pressure medium source to at least one load. The control valve has a first position in which the pressure line (13) is pressurized by the pressure medium source and a second position in which the load connected to the pressure line (13) is depressurized. The control valve (1) is directed toward the first position by an actuating device (17) and toward the second position by a restoring device (11). The control valve (1) has a safety function such that the pressure line (13) can be depressured to a container, irrespective of the position of the control valve (1). The safety function can be a valve function (20) integrated in a control slide (3) of the control valve (1).

20 Claims, 1 Drawing Sheet

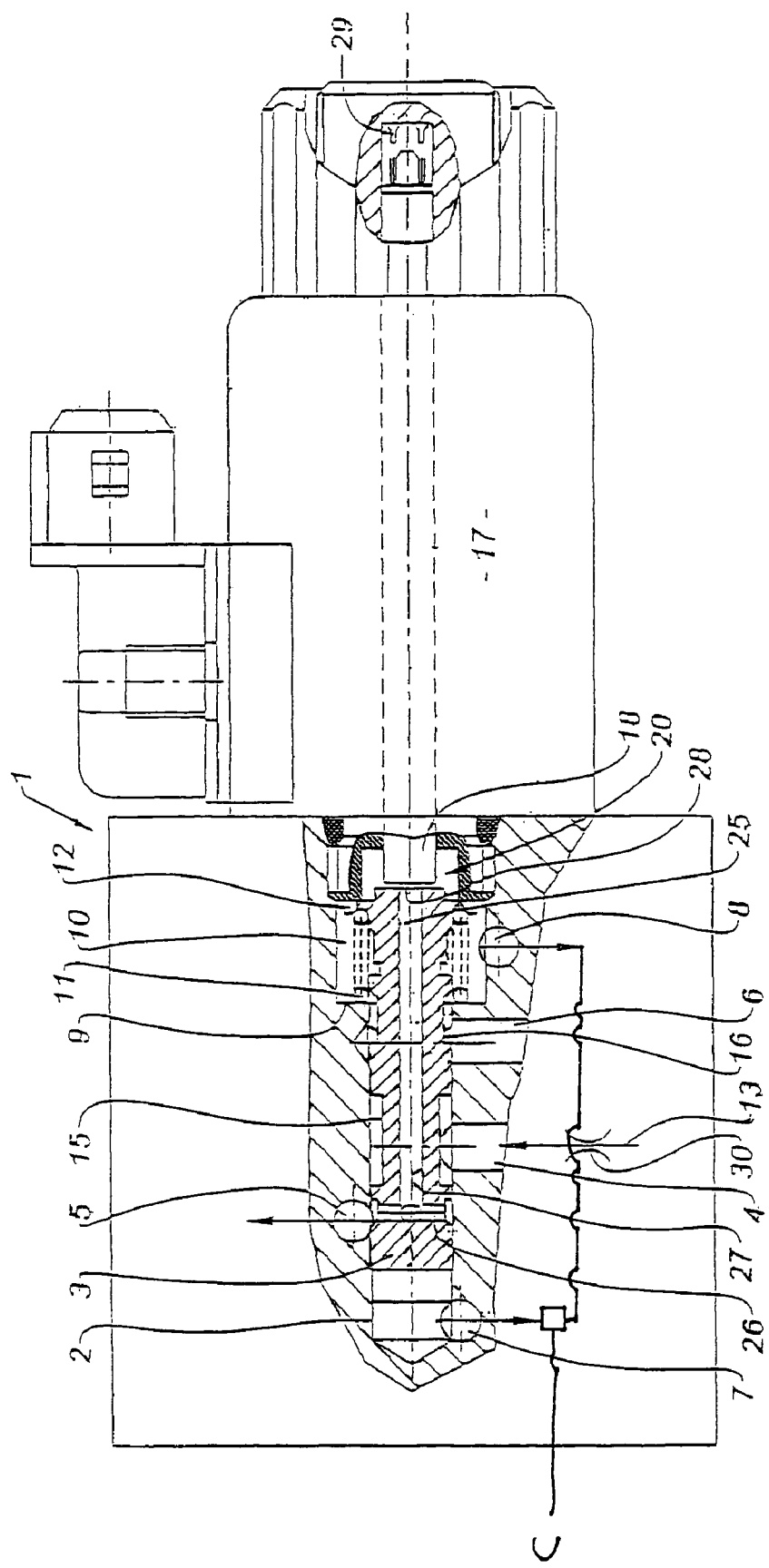

HYDRAULIC CONTROL VALVE

CROSS-REFERENCE TO RELATED APPLICATION

This application corresponds to German Application No. 103 08 910.1 filed Feb. 28, 2003, which is herein incorporated by reference in its entirety.

BACKGROUND OF THE INVENTION

The invention relates to a hydraulic control valve which is assigned to a pressure line which is led from a pressure medium source to at least one load. The control valve has a first position, in which the pressure line can be pressurized by means of the pressure medium source, and a second position, in which the load connected to the pressure line can be depressurized, it being possible for the control valve to be acted on in the direction of the first position by means of an actuating device and in the direction of the second position by means of a restoring device.

A control valve of the generic type is disclosed by DE 102 24 731 A1 as a security device of a hydrostatic drive system. In a first embodiment, the control valve used as a safety device is arranged in a pressure line which is led from a pressure medium source, formed as a feed pump, to the load, formed as pilot control valves of the directional control valves. In a second embodiment, the safety valve is arranged in a branch line branching off from the pressure line. In a first position of the control valve, which is designed as the functional position, the pressure line is open and the branch line is blocked off, as a result of which the pressure line can be pressurized and the control pressure produced by the feed pump is applied to the pilot control valves. In the first position of the safety valve, it is therefore possible for the directional control valves to be actuated while driving the pilot control valves. In a second position of the control valve, forming a safety position, the pressure line is blocked off and the branch line is connected to a container in order, in the event of a fault, a malfunction or a defect in the drive systems, to ensure that the pressure line and thus the pilot control valves are depressurized, as a result of which the directional control valves are loaded into the neutral position and the drives of the drive systems are stopped. The control valve used as a safety valve is acted on in the direction of the second position by a spring and in the direction of the first switching position by a switching magnet.

However, this safety circuit for the drive system can be achieved with the control valve only if it is ensured that the control valve is loaded into the second position when not activated. However, control valves that can be actuated in particular by means of electromagnets have a relatively low spring return force, since the switching force produced by electromagnets is limited and the use of more powerful electromagnets in order to overcome more powerful restoring springs entails increased installation space and increased costs. Because of this low spring return force, it cannot be ensured in control valves of the generic type that these are loaded in the second direction and the loads formed as pilot control valves are depressurized in the event of a malfunction of the control valve, for example jamming of the control valve as a result of contamination, when the electromagnet is not activated.

The present invention is based on the object of providing a control valve of the generic type which, with little expenditure, ensures that the loads are depressurized in the event of a functional fault of the control valve.

SUMMARY OF THE INVENTION

According to the invention, this object is achieved in that the control valve has a safety function by means of which, in the event of a functional fault of the control valve, the pressure line can be depressurized to a container, irrespective of the position of the control valve. According to the invention, a safety function is thus provided on the control valve which ensures that, in the event of a malfunction of the control valve, for example jamming of the control valve, the pressure line is depressurized to the container, although it is connected to the pressure medium source, and thus the load driven by the control valve is depressurized. In this way, when a restoring device producing a low restoring force is used, it can be ensured with little effort that the pressure line and thus the loads are depressurized in the event of a malfunction of the control valve.

In this case, the control valve can be arranged in a branch line branching off from the pressure line and can control the connection of the branch line to a container. According to a preferred embodiment of the invention, the control valve is arranged in a pressure line which is led from the pressure medium source to the load, the pressure line being opened in the first position and, in the second position, a section of the pressure line that is connected to the pressure medium source being blocked and it being possible for a section of the pressure line that is connected to the load to be depressurized to the container.

According to a preferred embodiment of the invention, the depressurising of the load in the event of a malfunction of the control valve can be ensured in a simple way if, by means of the safety function, that section of the pressure line which is connected to the load can be depressurized to the container.

Low installation expenditure for the safety function results in the case of a control valve having a control slide arranged in a housing bore if the safety function is formed by a valve function integrated in the control slide of the control valve.

According to an advantageous embodiment, this valve function can be achieved in a simple way if the control slide is provided with a relief duct which is connected to that section of the pressure line which is led to the load and to the container, it being possible for the connection of the relief duct to the container to be controlled by the actuating device. A relief duct can be formed in the control slide of the control valve with little additional expenditure. By driving the connection of the relief duct to the container by means of the actuating device of the control valve, it can be ensured in a simple way that, in the event of a control slide jamming between the first position and the second position, and the actuating device not being driven, the relief duct to the container can be controlled open and thus that section of the pressure line led to the load is depressurized to the container.

The safety function can be made possible over the entire switching range of the control valve if, according to an advantageous development of the invention, in the first position and in the second position, the relief duct is connected to that section of the pressure line which is led to the load.

According to an expedient refinement, the relief duct is led to one front end of the control slide and forms a control opening which can be driven by an actuating element that actuates the control slide, in particular an actuating plunger, belonging to the actuating device, the control slide being arranged in the region of the front end in a control pressure chamber which is connected to the container. Using a control opening formed at the front end of the control slide, the connection of the relief duct to the container can be controlled in a simple way by the actuating element of the actuating device.

If, with the actuating device driven, the actuating element can be loaded in the direction of a blocking position that blocks off the control opening, in a simple manner, with the actuating device driven and thus the control valve loaded into the first position, the actuating plunger is loaded into a position which blocks off the connection of the relief duct to the container via the control opening, as a result of which a pressure can be built up in the pressure line in order to actuate the load. When the actuating device is not driven, this makes it possible in a simple manner, in the event of a malfunction of the control valve, the control valve not being loaded into the second position by the restoring device, for the actuating plunger to be loaded by the pressure applied to the load into a position which opens the connection of the relief duct to the container via the control opening, in order to depressurise to the container that section of the pressure line which is led to the load.

It is particularly advantageously possible for the actuating element of the actuating device to be loaded by a spring in the direction of the position that blocks off the control opening. Using a spring, the actuating plunger can be kept in contact with the control opening in a simple manner, and thus the relief duct can be blocked off during normal operation of the control valve.

The relief duct is particularly advantageously formed as a longitudinal bore which is open towards the front end and a transverse bore which branches off from the longitudinal bore and which is connected to that section of the pressure line which is led to the load. A longitudinal bore and a transverse bore can be formed in the control slide of the control valve with little expenditure.

The control slide is expediently provided with a control recess, in particular an annular groove which, in the second position, blocks off the connection of that section of the pressure line which is connected to the control pressure source to that section of the pressure line which is connected to the load and, in the first position, connects that section of the pressure line which is connected to the control pressure source to that section of the pressure line which is led to the load. Using a control recess of this type, in the first position, the pressure line can be opened in a simple manner and the pressure medium source can be connected to the load and blocked off in the second position.

In this case, a volume limiting device, in particular a restricting device, is particularly advantageously arranged in that section of the pressure line which is connected to the control pressure source. In the event of a control slide jamming in the first position and the second position, the pressure line being opened by means of the control recess and the relief duct depressurising to the container that section of the pressure line which is connected to the load, by using a restrictor or a nozzle, a restriction of the volume in that section of the pressure line which is connected to the pressure medium source can be achieved, and it can thus be ensured that that section of the pressure line which is connected to the load is depressurized to the container via the relief duct in the event of a malfunction of the control valve.

The actuating device can be expediently formed as an electromagnet, in particular a switching magnet.

The restoring device of the control valve can be expediently formed as a spring.

Particular advantages result in the case of forming the control valve as a safety valve of a hydrostatic drive system having at least one control valve device that can be controlled by means of a hydraulic actuating device, it being possible, by means of the control valve, for the loading of the actuating device by the control pressure produced by a control pressure supply source to be controlled. By means of the safety function according to the invention of the safety valve, depressurization of the actuating devices, for example pilot control valves formed as pressure reduction valves, and thus loading of the control valve devices into the neutral position, which has the effect of stopping the drive of the drive system, can be ensured if, on the drive system, a fault occurs which leads to the driving of the electromagnet of the safety valve being ended, and the control slide of the safety valve is not loaded into the second position, which represents the safety position, because of a malfunction.

BRIEF DESCRIPTION OF THE DRAWING

Further advantages and details of the invention will be explained in more detail using the exemplary embodiment of the hydraulic control valve illustrated in the schematic FIGURE.

DESCRIPTION OF THE PREFERRED EMBODIMENT

In the FIGURE, a longitudinal section through a control valve 1 according to the invention used as a safety valve is illustrated. The control valve 1 has a control slide 3 which can be displaced longitudinally in a housing bore 2 of a housing. Connected to the housing bore 2 is a section 4 of a pressure line 13 connected to a pressure medium source. Adjacent to the connection of the section 4, a section 5 of the pressure line 13 is connected to the housing bore 2 and is led to one or more loads, for example the pilot control valves of the directional control valves of the drive system. Also connected to the housing bore 2 is a line 6, which can be formed as a load pressure feedback branch line. The front end of the longitudinal bore 2 which is on the left in the FIGURE is depressurized to a container C by means of a duct 7. The end of the longitudinal bore 2 which is on the right in the FIGURE is provided with a housing extension 9 of enlarged diameter. The control pressure chamber 10 formed by the housing extension 9 is likewise depressurized to the container C by means of a duct 8. Supported on the housing extension 9 is a restoring device 11, which is formed as a spring and which is operatively connected to a collar 12 of the control slide 3.

The control slide 3 is provided with a control recess 15 formed as an annular groove in order to control the connection of the section 4 (first section) to the section 5 (second section) of the pressure line 13. By means of a further control recess 16 shaped like an annular groove formed on the control slide 3, the connection of the line 6 to the control pressure chamber 10 and thus to the container C can be controlled.

In order to actuate the control valve 1, an actuating device 17 formed as an electromagnet, in particular a switching magnet, is provided. The actuating device 17 is fixed in the housing bore 2 in the region of the control pressure chamber 10 which is on the right in the FIGURE and has an actuating element 18 which is formed as an actuating plunger and which is operatively connected to the front end of the valve slide 3.

The restoring device 11 loads the control slide 3 into the second position illustrated in the FIGURE, in which the control recess 15 is arranged in the region of the connection of the first section 4 of the pressure line 13. In the second position, by means of the control recess 15, the connection of the section 4 to the section 5 of the pressure line 13 is interrupted, and thus the pressure line 13 is blocked off. The duct 6 is depressurized via the control recess 16 to the control pressure chamber 10 and therefore to the container.

If the actuating device 17 is driven, the control slide 3 can be loaded to the left in the FIGURE by means of the actuating element 18, counter to the force of the restoring device 11, into the first position, in which the section 4 is connected to the section 5 of the pressure line 13 via the control recess 15. The pressure line 13 is thus open in the first position. By means of the control recess 16, in the first position, the connection of the duct 6 to the control pressure chamber 10 is blocked.

According to the invention, the control valve 1 formed as a switching valve is provided with a safety function by means of which, irrespective of the position of the control valve 1, the pressure medium line 13 can be depressurized to the container. The safety function is formed by a valve function 20 which is integrated in the control slide 3. For this purpose, a relief duct 25 is provided, which is formed by a longitudinal bore 27 formed in the control slide 3 and also a transverse bore 26 branching off from the longitudinal bore 27. In this case, the transverse bore 26 is formed in the control slide 3 in such a way that, in the first position and the second position of the control slide 3, the said transverse bore 26 is connected to that section 5 of the pressure line which is led to the load. The longitudinal bore 27 extends to the front end of the control slide 3 on the right in the FIGURE and, at this front end, forms a control opening 28 which can be driven by the actuating element 18 of the actuating device 17.

If the actuating device 17 is driven, the actuating element 18 is loaded onto the control opening 28 in the direction of a blocked position of the valve function 20, the connection of the section 4 of the pressure line 13 to the pressure control chamber 10 connected to the container via the relief duct 25 being blocked. Furthermore, the actuating element 18 can be loaded by means of a spring 29 into a blocking position blocking off the control opening 28.

A volume limiting device 30 formed as a restrictor or nozzle is arranged in the section 4 of the pressure line 13.

The control valve 1 according to the invention acting as a safety valve operates as follows:

During the normal operation of the drive system secured by the control valve 1, the actuating device 17 is driven and the control slide 3 is loaded to the left in the FIGURE by the actuating element 18 into the first position, in which the connection of the duct 6 to the control pressure chamber 10 via the control recess 16 is blocked off, and the connection of the pressure line 13 from the section 4 to the section 5 via the control recess 15 is opened. The actuating element 18 closes the control opening 28, as a result of which the valve function 20 is blocked. A pressure for actuating the load, for example the pilot control valves of the directional control valves of the drive system, can thus be produced in the section 5 of the pressure line 13.

In the event of a functional fault of the drive system, the driving of the actuating device 17 is ended, as a result of which the control slide 3 is loaded by the restoring device 11 into the illustrated second position, in which the duct 6 is connected to the control pressure chamber 10 via the control recess 16 and is thus depressurized to the container. In the second position of the control valve 1, the connection of the section 4 to the section 5 of the pressure line 13 via the control recess 15 is blocked.

In this case, if a functional fault of the control valve 1 occurs, for example jamming of the control slide 3 between the first and the second position, for example on account of contamination, the relief duct 25 is connected via the transverse bore 26 to the section of the pressure line 13. The pressure present in the section 5 of the pressure line 13 and thus, via the transverse bore 26, in the longitudinal bore 27 loads the actuating element 18, at the control opening 28, of the non-driven actuating device 17 to the right in the FIGURE in the direction of an opening position of the valve function 20, as a result of which the relief duct 25 is depressurized via the control opening 28 to the control pressure chamber 10 and thus to the container. The pressure present in the section 5 of the pressure line 13 is therefore relieved, which achieves the situation where the pilot control valves of the directional control valves of the drive system are depressurized and the directional control valves are loaded into the neutral position, and thus the drives of the drive system are stopped. The section 5 of the pressure line 13 is in this case likewise depressurized to the container if, in the event of a functional fault of the control valve 1, the control recess 15 produces the connection of the section 4 to the section 5 of the pressure line 13 since, by means of the volume limiting device 30, the feed into the section 5 is limited.

With the safety function according to the invention, which is formed as a valve function 20 by the relief duct 25, the control opening 28 and the actuating element 18, in the event of a functional fault of the control valve 1 it is possible to ensure that the section 5 of the pressure line 13 is depressurized into the container and thus, as a result of depressurising the pilot control valves of the directional control valves, the drives of the drive system are stopped.

What is claimed is:

1. A hydraulic control valve assigned to a pressure line led from a pressure medium source to at least one load, comprising:
    a control valve having a first position in which a pressure line is pressurized by a pressure medium source and a second position in which a load connected to the pressure line is depressurized;
    an actuating device having an actuating element;
    a restoring device, wherein the control valve is acted on in a direction of the first position by the actuating device and in the direction of the second position by the restoring device; and
    a safety function by means of which, in the event of a functional fault of the control valve, the pressure line is depressurized to a container, irrespective of the position of the control valve, wherein the control valve has a control slide comprising a relief duct, wherein the relief duct forms a control opening in an end of the control slide, and wherein the actuating element of the actuating device can be loaded by a spring in the direction of a blocking position that blocks off the control opening.

2. The hydraulic control valve according to claim 1, wherein the control valve is arranged in the pressure line which is led from the pressure medium source to the load, wherein the pressure line is opened in the first position, wherein in the second position a first section of the pressure line that is connected to the pressure medium source is blocked, and wherein a second section of the pressure line that is connected to the load is depressurized to the container.

3. The hydraulic control valve according to claim 2, wherein by means of the safety function, the second section of the pressure line which is connected to the load is depressurized to the container.

4. The hydraulic control valve according to claim 2, further including a volume limiting device comprising a restricting device that is arranged in the first section of the pressure line which is connected to the control pressure source.

5. The hydraulic control valve according to claim 2, wherein the control valve includes a control slide arranged in a housing bore and wherein the safety function is formed by a valve function integrated in the control slide of the control valve.

6. The hydraulic control valve according to claim 1, wherein the control slide is arranged in a housing bore and wherein the safety function is formed by a valve function integrated in the control slide of the control valve.

7. The hydraulic control valve according to claim 6, wherein the relief is duct connected to a second section of the pressure line which is led to the load and also to the container, wherein the relief duct is connectable to the container by the actuating device.

8. The hydraulic control valve according to claim 7, wherein in the first position and in the second position, the relief duct is connected to the second section of the pressure line which is led to the load.

9. The hydraulic control valve according to claim 8, wherein the relief duct is led to one front end of the control slide and forms a control opening which can be driven by an actuating element that actuates the control slide, and wherein the control slide is arranged in the region of the front end in a control pressure chamber which is connected to the container.

10. The hydraulic control valve according to claim 7, wherein the relief duct is led to one front end of the control slide and forms the control opening which can be driven by the actuating element that actuates the control slide, and wherein the control slide is arranged in the region of the front end in a control pressure chamber which is connected to the container.

11. The hydraulic control valve according to claim 10, wherein the actuating element is an actuating plunger of the actuating device.

12. The hydraulic control valve according to claim 10, wherein when the actuating device is driven, the actuating element can be loaded in the direction of a blocking position that blocks off the control opening.

13. The hydraulic control valve according to claim 12, wherein the actuating element of the actuating device can be loaded by a spring in the direction of the blocking position that blocks off the control opening.

14. The hydraulic control valve according to claim 7, wherein the relief duct is formed as a longitudinal bore which is open towards a front end and a transverse bore which branches off from the longitudinal bore and which is connected to the second section of the pressure line which is led to the load.

15. The hydraulic control valve according to claim 6, wherein the control slide includes a control recess comprising an annular groove, which, in the second position, blocks off a connection of a first section of the pressure line which is connected to a control pressure source to a second section of the pressure line which is connected to the load and, in the first position, connects the first section of the pressure line which is connected to the control pressure source to the second section of the pressure line which is led to the load.

16. The hydraulic control valve according to claim 1, wherein the actuating device is an electromagnet.

17. The hydraulic control valve according to claim 1, wherein the actuating device is a switching magnet.

18. The hydraulic control valve according to claim 1, wherein the restoring device is a spring.

19. The hydraulic control valve according to claim 1, wherein the control valve is formed as a safety valve of a hydrostatic drive system having at least one control valve device that can be controlled by means of a hydraulic actuating device, it being possible by means of the control valve for loading of the actuating device to be controlled by a control pressure produced by a control pressure supply source.

20. A hydraulic control valve assigned to a pressure line led from a pressure medium source to at least one load, comprising:
a control valve having a first position in which a pressure line is pressurized by a pressure medium source and a second position in which a load connected to the pressure line is depressurized;
an actuating device;
a restoring device, wherein the control valve is acted on in a direction of the first position by the actuating device and in the direction of the second position by the restoring device;
a safety function by means of which, in the event of a functional fault of the control valve, the pressure line is depressurized to a container, irrespective of the position of the control valve:
wherein the control valve includes a control slide arranged in a housing bore and wherein the safety function is formed by a valve function integrated in the control slide of the control valve;
wherein the control slide includes a relief duct connected to a second section of the pressure line which is led to the load and also to the container, and wherein the relief duct is connectable to the container by the actuating device;
wherein the relief duct is led to one front end of the control slide and forms a control opening which can be driven by an actuating element that actuates the control slide, and wherein the control slide is arranged in the region of the front end in a control pressure chamber which is connected to the container;
wherein the actuating element is an actuating plunger of the actuating device; and
wherein the actuating element of the actuating device can be loaded by a spring in the direction of a blocking position that blocks off the control opening.

* * * * *

UNITED STATES PATENT AND TRADEMARK OFFICE
CERTIFICATE OF CORRECTION

PATENT NO. : 6,973,940 B2
APPLICATION NO. : 10/787787
DATED : December 13, 2005
INVENTOR(S) : Kleineisel It is certified that error appears in the above-identified patent and that said Letters Patent is hereby corrected as shown below:

Title page,
Item [73], should read:
-- [73] Assignee: Luna Innovations Incorporated
Blacksburg, VA (US) --.

Signed and Sealed this

Sixth Day of February, 2007

JON W. DUDAS
*Director of the United States Patent and Trademark Office*

UNITED STATES PATENT AND TRADEMARK OFFICE
CERTIFICATE OF CORRECTION

PATENT NO.        : 6,973,940 B2                                                Page 1 of 1
APPLICATION NO.   : 10/787787
DATED             : December 13, 2005
INVENTOR(S)       : Kleineisel It is certified that error appears in the above-identified patent and that said Letters Patent is hereby corrected as shown below:

On the title page, item (57), ABSTRACT, line 10, "can be depressured" should read -- can be depressurized --

Signed and Sealed this

Twenty-third Day of June, 2009

JOHN DOLL
*Acting Director of the United States Patent and Trademark Office*